United States Patent
Corma Canós et al.

(10) Patent No.: US 6,696,033 B2
(45) Date of Patent: Feb. 24, 2004

(54) MICROPOROUS ACIDIC OXIDE WITH CATALYTIC PROPERTIES ITQ-18

(75) Inventors: Avelino Corma Canós, Valencia (ES); Vicente Fornes Segui, Valencia (ES); Urbano Díaz Morales, Valencia (ES)

(73) Assignees: Consejo Superior de Investigaciones Cientificas, Madrid (ES); Universidad Politecnica de Valencia, Valencia (ES)

(*) Notice: Subject to any disclaimer, the term of this patent is extended or adjusted under 35 U.S.C. 154(b) by 198 days.

(21) Appl. No.: 10/047,938

(22) Filed: Jan. 15, 2002

(65) Prior Publication Data

US 2003/0003046 A1 Jan. 2, 2003

Related U.S. Application Data

(63) Continuation of application No. PCT/ES00/00243, filed on Jul. 7, 2000.

(30) Foreign Application Priority Data

Jul. 15, 1999 (ES) .............................. 9901642

(51) Int. Cl.[7] .................... C01B 33/26; C01B 33/38; C01B 33/44
(52) U.S. Cl. ............... 423/329.1; 423/718; 502/80
(58) Field of Search .................. 423/329.1, 718; 502/80

(56) References Cited

U.S. PATENT DOCUMENTS

| 5,229,341 A | * | 7/1993 | Kresge et al. ................. 502/64 |
| 5,250,277 A | * | 10/1993 | Kresge et al. ............ 423/329.1 |
| 5,278,115 A | * | 1/1994 | Kresge et al. ................. 502/84 |
| 6,231,751 B1 | | 5/2001 | Canos et al. | |
| 6,555,090 B1 | * | 4/2003 | Chica Lara et al. ......... 423/718 |

FOREIGN PATENT DOCUMENTS

| EP | 54.364 A | 6/1982 |
| ES | 2124154 | 5/2001 |

* cited by examiner

*Primary Examiner*—David R Sample
(74) *Attorney, Agent, or Firm*—Klauber & Jackson

(57) ABSTRACT

The invention concerns a microporous crystalline material, with a characteristic X-ray diffractogram, made up by oxygen tetrahedra and one metal ($T^{+4}$ and $T^{+3}$) with the possibility of introducing surface acidity produced by the substitution in the network of some $T^{+4}$ cations (normally $Si^{+4}$) by $T^{+3}$ cations (normally $Al^{+3}$), which gives rise to a structural charge deficiency which can be offset by protons, Brönsted acidity, and/or cations with a high charge-radium ratio, Lewis acidity. The method of preparation is based on the modification of the laminar structure of a mixed oxide (normally $SiO_2$, $Al_2O_3$) synthesized from a gel treated under controlled hydrothermal conditions, intercalating organic molecules with a proton-acceptor group and a long hydrocarbonic chain between its laminae. The intercalated material has laminae with a significant separation between them due to the presence between them of the organic chains. The swollen material is then treated in order to separate and disperse the laminae. The final washing and subsequent calcination gives rise to a microporous material with a high external surface, the object of this invention.

22 Claims, 3 Drawing Sheets

MICROPOROUS ACIDIC OXIDE WITH CATALYTIC PROPERTIES ITQ-18

This application is a continuation of PCT/ES00/00243 filed Jul. 7, 2000.

FIELD OF THE TECHNIQUE

Preparation of microporous materials with application in catalysis.

BACKGROUND

This invention concerns a swellable mixed laminar oxide capable of being delaminated into individual structural layers with microporous canals and cavities.

Laminar materials such as clays, zirconium phosphates and phosphonates, hydroxycarbonates of the hydrotalcite type, silicic acids (kanemite, magadite, etc.), transition metal sulphides, graphite, laminar hydroxides and others, can become swollen in the presence of water and/or appropriate interlaminar cations. The individual laminae of these materials are maintained together through weak bonds of the hydrogen bond type and/or electrostatic interactions. These bonds are easily broken when the intercalation force or solvation energy of the cations is greater than the interlaminar attraction forces. This is the case, for example, with sodium montmorillonite which swells up to interlaminar distances of over 10 nm, in the presence of an excess of water. The interesting aspect of the swollen materials is to make the interlaminar space accessible to the reactive molecules and, consequently, the internal surface, considerably increasing the accessible active surface of the catalyst. When the material intercalated between the mixed oxide laminae is eliminated by calcination, the swollen laminar compound collapses, recovering the original interlaminar distance.

Several procedures have been developed in order to avoid the interlaminar collapse. One of these consists of the intercalation, by interlaminar exchange or solvation of cations, of polar molecules with very long hydrocarbon chains which give rise to materials with very large separation distances between laminae. In these conditions, the interlaminar attraction forces are very weak, and a subsequent treatment, for example, with ultrasounds or stirring, can lead to definitively separate the laminae from each other.

Spanish patent ES-2124154 refers to a preparation method of a microporous solid with catalytic properties and with high external surface, called ITQ-2, which is synthesized through an intercalation procedure of organic molecules between the laminae of the appropriate precursor and subsequent delamination. However the properties of this solid as catalyst or catalyst additive need to be improved for the purposes of specific industrial processes.

The present invention includes the method of preparation of the laminar solid and its subsequent treatment to the point of achieving a highly-accessible microporous material with acidic characteristics capable of being used as a catalyst.

DESCRIPTION OF THE INVENTION

In the present invention, a material is obtained which we have called ITQ-18, with a microporous structure and extensive external surface, capable of supporting Brönsted and Lewis acid centers. This new material is obtained from a swollen laminar precursor which we shall call PREITQ-18, transforming it through subsequent treatments into a delaminated material. The ITQ-18 material obtained in this invention, and which is characterised by its X-ray diffractogram, has very specific properties when it is used as a catalyst in reactions with organic compounds.

The present invention also refers to a preparation process of ITQ-18 which comprises:

an initial stage of obtention of a laminar material wherein 4,4'-bipyridyl as organic compound is used, the swelling of said laminar material through the intercalation of organic molecules which have a proton-acceptor group and a hydrocarbon chain between the laminae of said laminar material, wherein PREITQ-18 is obtained, the at least partially delamination of PREITQ-18 by using mechanical stirring, ultrasounds, spray-drying, lyophilization or a combination thereof and calcination.

The preparation process therefore consists of, in an initial stage, the synthesis of a swollen laminar precursor (PREITQ-18) which is obtained by mixing a source of silicon in an autoclave, such as Aerosil, Ludox, tetraethyl orthosilicate (TEOS), sodium silicate or any other known sources, a source of aluminium, such as $Al_2(SO_4)_3$, $AlCl_3$, boehmite, pseudoboehmite, or any other, a source of sulphates, such as sulphuric acid and an organic compound which is 4,4'-bipyridyl, in addition to water and an alkanol, preferably ethanol, in the appropriate proportions. The synthesis takes place at temperatures between 100° C. and 200° C., with permanent stirring of the gel and a duration between 12 hours and 15 days, preferably between 1 and 7 days. At the end of this time, the reaction product, a white solid with a pH between 11 and 12, is washed with distilled water, filtered and dried.

The laminar material obtained is swollen in a solution which we shall call a swelling solution. For this purpose, the solid is exchanged and/or intercalated with an organic compound with a long chain in order to keep the laminae well separated and thus reduce the attraction forces holding them together. The material used can be any amine or alkyl ammonium compound, preferably cetyl trimethyl ammonium hydroxide ($CTMA^+$). More specifically and, if $CTMA^+$ is used, the conditions for the exchange are: the solutions of $CTMA^+$ ($OH^-$, $Br^-$) (29% in weight) and $TPA^+(OH^-, Br^-)$ (40% in weight) with a proportion of suspension: CTMA:TPA=27:105:33 by weight, are added to a suspension of the laminar material (20% in weight of solid).

It is then left with permanent stirring and reflux, at a temperature between 20° C. and 200° C., and preferably between 40° C. and 120° C., for not less than 1 hour, until the material swells.

The material obtained (PREITQ-18) is washed exhaustively with water and dried at temperatures below 300° C., and preferably below 150° C. Once washed and dried, the swollen material presents a characteristic X-ray diffraction diagram as shown in FIG. 1, the basal spaces and relative intensities of which are summed up on Table 1.

TABLE 1

| d (Å) | $I/I_0 * 100$ |
|---|---|
| 36.86 | vs |
| 21.43 | m |
| 13.38 | m |
| 11.23 | w |
| 10.05 | w |
| 6.93 | w |
| 6.78 | w |

TABLE 1-continued

| d (Å) | I/I$_0$ * 100 |
|---|---|
| 4.54 | w |
| 4.31 | m |
| 4.14 | m |
| 4.00 | m |
| 3.86 | m |
| 3.73 | m |
| 3.61 | m |
| 3.49 | m |
| 3.40 | m |
| 3.38 | m |
| 3.34 | w |
| 2.48 | w |

In this description, and unless otherwise specified, the relative intensities of the X-ray diffraction peaks will be represented with the symbols and meanings established below:

w . . . weak . . . 0–20% relative intensity
m . . . medium . . . 20–40%
s . . . strong . . . 40–60%
vs . . . very strong . . . 60–100%

Then, the laminae of the swollen material are dispersed. For this purpose, an aqueous suspension is prepared in a $H_2O$/swollen material weight proportion of between 4 and 200, and preferably between 10 and 100. This suspension is subjected to a controlled stirring process by mechanical means, ultrasounds or any other known means, such as lyophilization, during a period of between 30 minutes and 20 hours, and preferably between 1 minute and 10 hours.

The gelling of the system contributes to increasing the difficulties of filtration to an extraordinary extent. In order to improve these, the addition of flocculants, such as ClH, AcH or $NO_3H$, can be used and/or the subsequent centrifuging of the suspension.

The material obtained, once dry, presents an X-ray diffraction diagram (FIG. 2) where it is evident that, even when maintaining order at a short and long distance, the majority of the diffraction peaks corresponding to the laminar characteristics of these materials have disappeared.

The calcination of this material between 300° C. and 800° C. and, preferably, between 400° C. and 600° C., gives rise to the product called ITQ-18. The ITQ-18 material presents an X-ray diffraction diagram such as the one in FIG. 3, with basal spacings and relative intensities summarised on Table 2.

TABLE 2

| d (Å) | I/I$_0$ * 100 |
|---|---|
| 34.82 | vs |
| 20.77 | m |
| 11.23 | w |
| 10.12 | w |
| 8.43 | m |
| 6.71 | w |
| 6.41 | w |
| 6.11 | w |
| 4.65 | m |
| 4.30 | s |
| 3.86 | m |
| 3.73 | m |
| 3.67 | w |
| 3.45 | w |
| 3.34 | s |
| 3.17 | w |

TABLE 2-continued

| d (Å) | I/I$_0$ * 100 |
|---|---|
| 3.06 | w |
| 3.00 | w |
| 2.51 | w |

The product obtained (delaminated zeolite ITQ-18) has unique characteristics of specific surface, porosity, acidity, thermal stability and catalytic behaviour. On Table 3, the values obtained by applying the BET equation to the values of the nitrogen absorption isotherm at the temperature of liquid nitrogen are summarised. On this Table, it can be observed that the external surface of the ITQ-18 is much larger than that of any of the zeolitic material described in the bibliography.

TABLE 3

| Sample | $S_{TOT}$ (m$^2$g$^{-1}$) | $S_{MIC}$ (m$^2$g$^{-1}$) | $S_{EXT}$ (m$^2$g$^{-1}$) | $V_{TOT}$ (cm$^3$g$^{-1}$) | $V_{MIC}$ (cm$^3$g$^{-1}$) | Si/Al |
|---|---|---|---|---|---|---|
| ITQ18 (1) | 549 | 91 | 458 | 0.5593 | 0.0399 | 15 |
| ITQ18 (2) | 676 | 13 | 663 | 0.6167 | 0.0041 | 45 |

If the initial laminar compound is a silicoaluminate, then the delaminated compound has structural acidity (replacement of $Si^{+4}$ by $Al^{+3}$) and thus, it will be catalytically active. In addition, on account of the fact that the external surface increases, the accessibility of these cases will increase proportionately. Table 4 shows the values in $\mu$mol of pyridine absorbed at different temperatures per gram of sample for the zeolite ITQ-18.

TABLE 4

| | 150° C. | | 250° C. | | 350° C. | | |
|---|---|---|---|---|---|---|---|
| Sample | L | B | L | B | L | B | Si/Al |
| ITQ18 (1) | 8.04 | 26.08 | 11.02 | 25.97 | 9.80 | 14.50 | 15 |
| ITQ18 (2) | 6.89 | 23.56 | 8.11 | 23.56 | 10.25 | 16.61 | 45 |

The material called ITQ-18 has a chemical composition represented by the formula $(XO_2)_n(Y_2O_3)_m(H_2O)_p$, where X represents a tetravalent element and Y a trivalent element, with the atomic ratio between X and Y being at least 5.

Preferably, X in $XO_2$ represents, at least, one tetravalent element selected from among silicon, germanium and, most specifically, silicon, which can in some cases contain titanium as well.

Preferably, Y in $Y_2O$ represents, at least, one trivalent element selected from among aluminium, boron, iron, chromium and gallium, and most specifically aluminium.

The oxide material of the present invention can comprises in its structure tetravalent, trivalent, bivalent and pentavalent elements. Preferred bivalent elements are Co, Ni, Zn, Mn, and as pentavalent element V is the preferred one.

The oxide material ITQ-18 can be subjected to a post-calcination in the presence of fluorine or a fluorine compound, or a treatment with a phosphorus compound.

The present invention also refers to a product which is the result of the subsequent treatments the ITQ-18 may undergoes according to the preceding paragraph.

The methods of preparation and the catalytic characteristics of the resultant materials are described below by means of non-restrictive examples.

EXAMPLES

EXAMPLE 1

Figure 1:
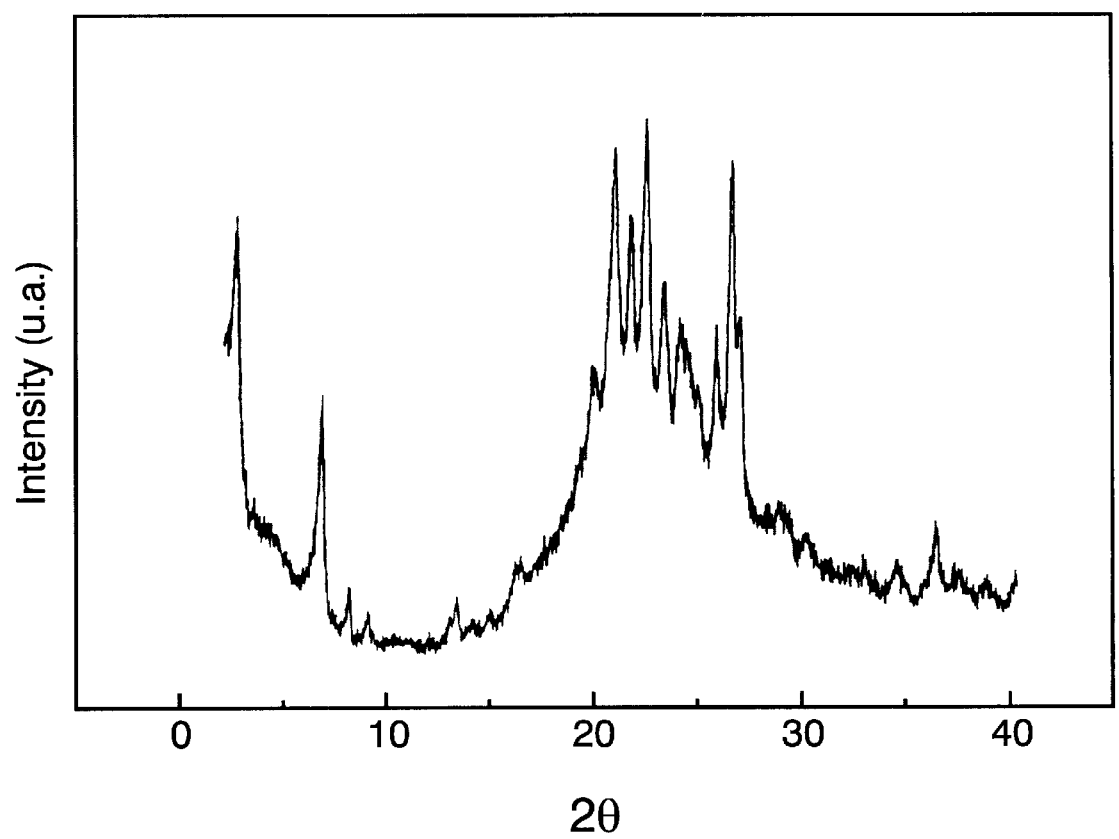
FIG. 1 is an x-ray diffraction pattern of PREITQ-18.
Figure 2:
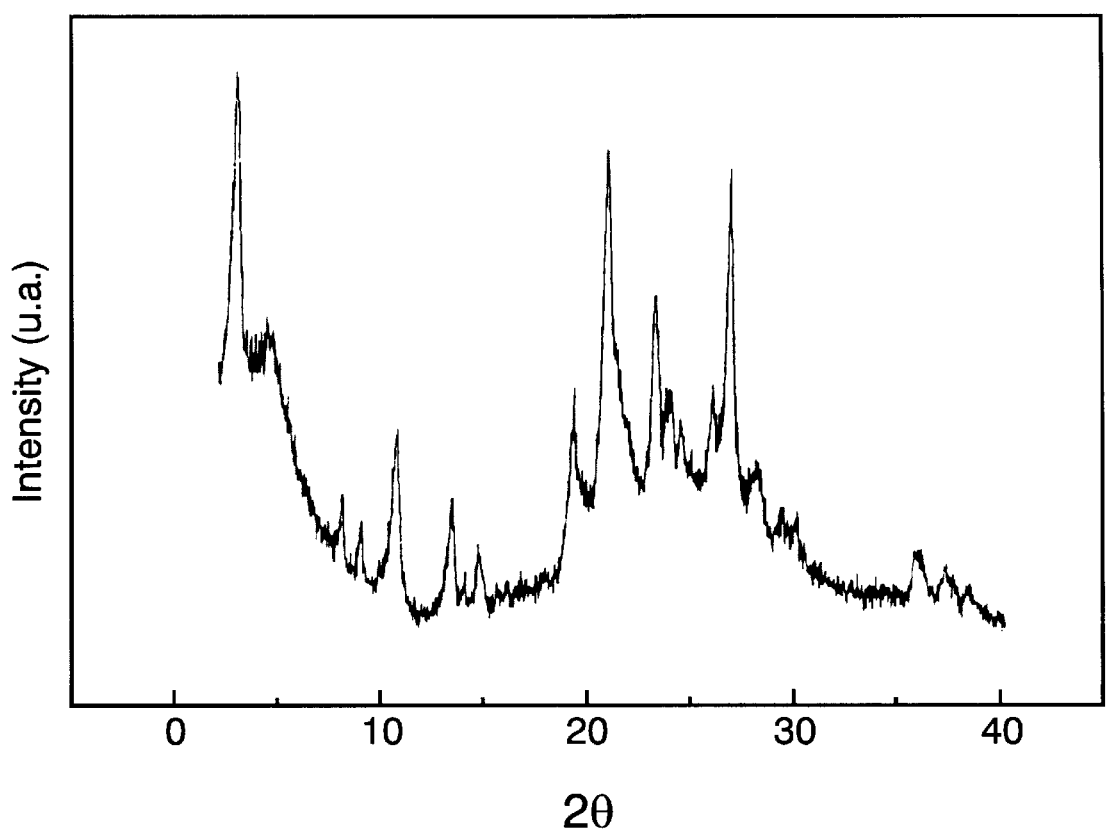
FIG. 2 is an x-ray diffraction pattern of ITQ-18.

This first example describes the preparation of a swollen laminar silicoaluminate (PREITQ-18), with a Si/Al proportion in the gel of 45. The synthesis gel was prepared in the following manner:

A solution A is prepared, made up by 1.820 g of 4,4'-bipyridyl (R) (Fluka, 98%) which are dissolved in 10.083 g EtOH (Baker). To this mixture is added another solution B consisting of 20.064 g of sodium silicate (8.02% $Na_2O$, 24.92% $SiO_2$, 67.05% $H_2O$, Merck) dissolved in 13.377 g of $H_2O$ milliQ. Finally, a solution C is added which is made with 0.616 g of aluminium sulphate (48.66% $H_2O$, 51.34% $Al_2(SO_4)_3$, Merck) and 1.524 g of sulphuric acid (Ridel den Häggen, 98%) dissolved in 22.776 g $H_2O$ milliQ.

The mixture obtained is stirred continuously for 2 hours at room temperature in order to achieve its complete homogenization. The gel obtained has a pH close to 9 and its molar composition is as follows:

$$23.9\ Na_2O : 12.7\ R : 1\ Al_2O_3 : 90\ SiO_2 : 2996\ H_2O : 237$$

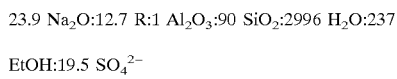

$$EtOH : 19.5\ SO_4^{2-}$$

The mixture is introduced into autoclaves and is left for 1 day at 135° C. with a rotation speed of 60 rpm. Following this treatment, the samples are filtered and washed with distilled water until the pH of the wash water is <9.

The material obtained was exchanged with cetyl trimethyl ammonium (CTMA) according to the following procedure: 3 g of sample were suspended in a solution containing 12 g of water milliQ, 60 g of $CTMA^+$ ($OH^-$, $Br^-$) (29% in weight) and 18 g of $TPA^+$ ($OH^-$, $Br^-$) (40% in weight).

The suspension was kept under reflux for 16 hours and was then washed exhaustively with water, and the liquids were separated from the solids. The swollen product obtained (PREITQ-18) had a diffraction diagram with the $d_{hkl}$ spacing values and relative intensities which are included on Table 1.

To the material obtained, 600 ml of distilled water were added while stirring constantly. Then, the suspension was treated with ultrasounds at a frequency of 50 Hz and a power of 50 Watts for 1 hour, at the end of which the gelled suspension was centrifuged and dried at 100° C. The dry sample was calcinated at 580° C. for 7 hours giving rise to a microporous material of the type claimed in this patent with a total specific surface of around 600 $m^2g^{-1}$, of which between 80% and 90% correspond to the external surface and with $d_{hkl}$ spacings like those shown on Table 2.

EXAMPLE 2

Identical procedure to that described in Example 1, but using a initial material (PREITQ-18) with a proportion of Si/Al=15 in the synthesis gel. The microporous material obtained has an X-ray diagram with $d_{hkl}$ spacings and intensities like those shown on Table 2. The product has a total area in excess of 600 $m^2g^{-1}$ and an external surface of more than 500 $m^2g^{-1}$.

EXAMPLE 3

The process followed in Example 1 was repeated except that the suspension of the product obtained after the treatment with ultrasounds was acidified with HCl 6N, in order to facilitate the flocculation of the solid in suspension, prior to the separation of the liquid phase from the solid phase.

Figure 3:
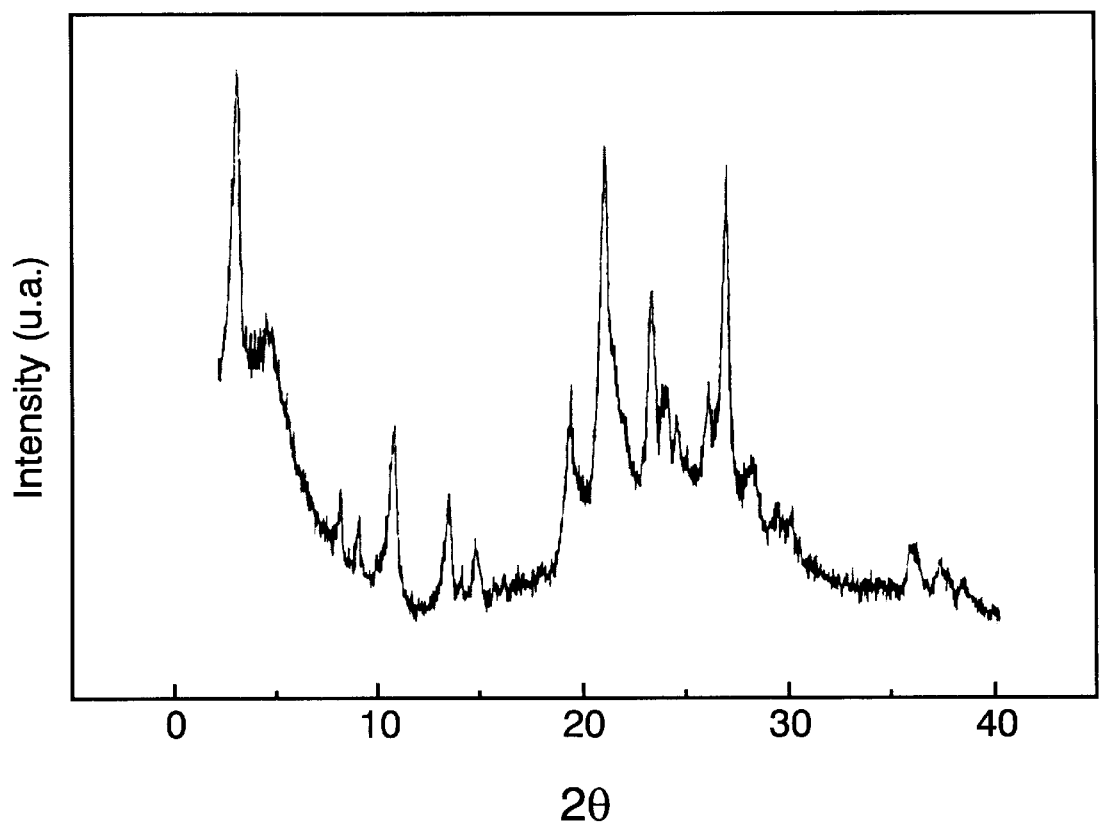
FIG. 3 is the x-ray diffraction pattern of the ITQ-18 formed in Example 3.

The solid obtained, once calcinated, presented a diffraction diagram like that shown in FIG. 3 with relative intensities comparable to those included on Table 2, and a total specific surface of 675 $m^2g^{-1}$ of which practically all pertain to the external surface.

EXAMPLE 4

The same procedure in Example 1 is described but with a final treatment, prior to calcination, with lyophilization of the resultant gel and subsequent calcination.

EXAMPLE 5

This example describes the procedure used in Example 1, replacing the ultrasound process by a system with constant stirring, using a Cowles stirrer for 1 hour at 1840 rpm. The suspension obtained was acidified with HCl 6N (pH≈2), was then washed with distilled water and was centrifuged several times until obtaining a final pH above 6. Once dried and calcinated at 580° C., the laminar oxide obtained presented a diffraction diagram like the one shown in FIG. 3.

What is claimed is:

1. A swollen laminar precursor, called PREITQ-18, having an X-ray diffractogram which comprises the following values of the basal spaces and relative intensities:

| d (Å) | $I/I_0$ * 100 |
|---|---|
| 36.86 | vs |
| 21.43 | m |
| 13.38 | m |
| 11.23 | w |
| 10.05 | w |
| 6.93 | w |
| 6.78 | w |
| 4.54 | w |
| 4.31 | m |
| 4.14 | m |
| 4.00 | m |
| 3.86 | m |
| 3.73 | m |
| 3.61 | m |
| 3.49 | m |
| 3.40 | m |
| 3.38 | m |
| 3.34 | w |
| 2.48 | w | wherein "s", "vs", "w" and "m" mean "strong", "very strong", "weak" and "medium", respectively, and which is the precursor of an oxide material called ITQ-18 having, in its calcinated form, a chemical composition represented by the formula $(XO_2)_n(Y_2O_3)_m(H_2O)_p$, wherein X represents at least a tetravalent element and Y represents at least a trivalent element.

2. An oxide material called ITQ-18, having in its calcinated form, a chemical composition represented by the formula $(XO_2)_n(Y_2O_3)_m(H_2O)_p$, wherein X represents at least a tetravalent element and Y represents at least a trivalent element, and presents an X-ray diffractogram which comprises the following values of the basal spaces and relative intensities:

| d (Å) | I/I$_0$ * 100 |
|---|---|
| 34.82 | vs |
| 20.77 | m |
| 11.23 | w |
| 10.12 | w |
| 8.43 | m |
| 6.71 | w |
| 6.41 | w |
| 6.11 | w |
| 4.65 | m |
| 4.30 | s |
| 3.86 | m |
| 3.73 | m |
| 3.67 | w |
| 3.45 | w |
| 3.34 | s |
| 3.17 | w |
| 3.06 | w |
| 3.00 | w |
| 2.51 | w | wherein "s", "vs", "w" and "m" mean "strong", "very strong", "weak" and "medium", respectively, which has an external surface of at least 100 m$^2$g$^{-1}$, measured by absorption-desorption of N$_2$.

3. An oxide material, in accordance with claims 1 or 2 wherein said oxide material comprises the oxides XO$_2$ and Y$_2$O$_3$, wherein X represents at least one tetravalent element and Y represents at least one trivalent element, the atomic ratio between X and Y being at least 5.

4. An oxide material, in accordance with claims 1 or 2, wherein X represents at least one tetravalent element.

5. An oxide material, in accordance with claims 1 or 2 characterized in that X is selected from the group consisting of silicon, germanium, tin, titanium and combinations thereof.

6. An oxide material, in accordance with claims 1 or 2, wherein Y represents at least one trivalent element selected from among aluminium, boron, iron, chromium, gallium and combinations thereof.

7. An oxide material, in accordance with claims 1 or 2, wherein said oxide material further comprises in its structure at least a bivalent element and at least a pentavalent element.

8. An oxide material, in accordance with claim 7, wherein said oxide material comprises a bivalent element selected from the group consisting of Co, Ni, Zn and Mn.

9. An oxide material, in accordance with claim 7, wherein said oxide material comprises V as pentavalent element.

10. An oxide material, in accordance with claims 1 or 2, wherein X represents silicon and Y represents aluminium.

11. An oxide material, in accordance with claims 1 or 2, wherein the atomic ratio of X to Y is greater than 5.

12. An oxide material, in accordance with claims 1 or 2, wherein the atomic ratio of X to Y is greater than 10.

13. An oxide material, in accordance with claims 1 or 2, wherein the atomic ratio of X to Y is greater than 30.

14. An oxide material, in accordance with claims 1 or 2, wherein the atomic ratio of X to Y is greater than 40.

15. An oxide material in accordance with claims 1 or 2, wherein the atomic ratio of X to Y is comprised in a range between 30 and 500.

16. An oxide material, in accordance with claim 2, characterized in that it has an external surface measured by absorption-desorption of N$_2$ of more than 300 m$^2$g$^{-1}$.

17. Process for the preparation of an oxide material called ITQ-18, which in its calcinated form, has a chemical composition represented by the formula $(XO_2)_n(Y_2O_3)_m(H_2O)_p$, wherein X represents at least a tetravalent element and Y represents at least a trivalent element, and presents an X-ray diffractogram which comprises the following values of the basal spaces and relative intensities:

| d (Å) | I/I$_0$ * 100 |
|---|---|
| 34.82 | vs |
| 20.77 | m |
| 11.23 | w |
| 10.12 | w |
| 8.43 | m |
| 6.71 | w |
| 6.41 | w |
| 6.11 | w |
| 4.65 | m |
| 4.30 | s |
| 3.86 | m |
| 3.73 | m |
| 3.67 | w |
| 3.45 | w |
| 3.34 | s |
| 3.17 | w |
| 3.06 | w |
| 3.00 | w |
| 2.51 | w | wherein "s", "vs", "w" and "m" mean "strong", "very strong", "weak" and "medium", respectively, as defined in claim 2, characterized in that it comprises:

an initial stage of obtention of a laminar material wherein 4,4'-bipyridyl as organic compound is used, the swelling of said laminar material through the intercalation of organic molecules which have a proton-acceptor group and a hydrocarbon chain between the laminae of said laminar material, wherein PREITQ-18 is obtained, the at least partially delamination of PREITQ-18 by using mechanical stirring, ultrasounds, spray-drying, lyophilization or a combination thereof and calcination.

18. A process according to claim 17, wherein the intercalation is comprises:

reacting the laminar material with said organic molecules, stirring and refluxing until the laminar material swells, and washing and drying the swollen laminar material PREITQ-18 obtained.

19. A process, in accordance with claim 17, wherein an acid treatment is carried out following the delamination step and the calcination.

20. A process, in accordance with claim 17, wherein it comprises a post-calcination step in the presence of fluorine or a fluorine compound.

21. A process, in accordance with claim 17, wherein it comprises a treatment with a phosphorus compound after calcination.

22. An oxide material characterized in that it is obtained by means of a process according to either of claims 20 or 21.

* * * * *